United States Patent
Maki et al.

(10) Patent No.: US 7,653,404 B2
(45) Date of Patent: Jan. 26, 2010

(54) ANALYZING TECHNOLOGY OF RADIO WAVE IN WIRELESS INFORMATION COMMUNICATION

(75) Inventors: Makoto Maki, Nagoya (JP); Takashi Ishidoshiro, Nagoya (JP)

(73) Assignee: Buffalo, Inc., Nagoya (JP)

( * ) Notice: Subject to any disclaimer, the term of this patent is extended or adjusted under 35 U.S.C. 154(b) by 352 days.

(21) Appl. No.: 10/384,403

(22) Filed: Mar. 6, 2003

(65) Prior Publication Data

US 2004/0127162 A1 Jul. 1, 2004

(30) Foreign Application Priority Data

Dec. 25, 2002 (JP) .............................. 2002-374342

(51) Int. Cl.
- H04B 7/00 (2006.01)
- H03C 1/62 (2006.01)
- H04B 17/00 (2006.01)

(52) U.S. Cl. .................... 455/513; 455/115.3; 455/63.3; 455/67.13; 455/134; 455/135; 455/509

(58) Field of Classification Search ................. 455/513, 455/115.3, 63.3, 67.13, 134, 135, 509
See application file for complete search history.

(56) References Cited

U.S. PATENT DOCUMENTS

| | | | |
|---|---|---|---|
| 5,400,950 A | | 3/1995 | Myers et al. |
| 5,802,101 A | * | 9/1998 | Maruyama ................ 455/343.5 |
| 6,595,404 B2 | | 7/2003 | Suzuki et al. |
| 6,732,163 B1 | * | 5/2004 | Halasz ........................ 455/450 |
| 6,756,184 B2 | | 6/2004 | Peng et al. |
| 6,759,319 B2 | | 7/2004 | Viswanadam et al. |
| 6,809,020 B2 | | 10/2004 | Sakurai et al. |

(Continued)

FOREIGN PATENT DOCUMENTS

JP 2002-158667 5/2002

(Continued)

OTHER PUBLICATIONS

Wright, Joshua; "Layer 2 Analysis of WLAN Discovery Applications for Intrucion Detection", 'Online!, Aug. 11, 2002, pp. 1-13, XP002274462.

(Continued)

Primary Examiner—Matthew D Anderson
Assistant Examiner—Wen W Huang
(74) Attorney, Agent, or Firm—Beyer Law Group LLP

(57) ABSTRACT

To provide a technique for analyzing radio wave condition affording improved accuracy of discrimination of radio wave propagation condition on a per-channel basis.

Analyzer device 10 for analyzing the condition of radio waves used for wireless LAN communications comprises a reception portion 410 for receiving radio signals in a plurality of frequency bands; a first strength sensing portion 420 for sensing the field strength RSSI1 of the center frequency band on a per-channel basis from a received radio signal; a despreading portion 430 for despreading the received radio signal; a second strength sensing portion 440 for sensing the field strength RSSI2 of the center frequency band on a per-channel basis from the despread radio signal; a discriminating portion 450 for discriminating radio wave condition by cross-checking RSSI1 and RSSI2 on a per-channel basis; and a display portion 460 for displaying the discriminated radio wave condition.

9 Claims, 8 Drawing Sheets

U.S. PATENT DOCUMENTS

| | | |
|---|---|---|
| 7,034,402 B1 | 4/2006 | Seshan |
| 7,141,869 B2 | 11/2006 | Kim et al. |
| 2002/0173271 A1* | 11/2002 | Blair et al. .................... 455/63 |
| 2003/0031231 A1* | 2/2003 | You et al. ................... 375/133 |
| 2005/0116340 A1 | 6/2005 | Shindo |

FOREIGN PATENT DOCUMENTS

| | | |
|---|---|---|
| JP | 2002-345028 | 11/2002 |
| JP | 2002-374575 | 12/2002 |
| WO | WO02/093839 A2 | 11/2002 |

OTHER PUBLICATIONS

European Search Report in Corresponding EPC Application No. 03253438.0-1525-, mailed May 7, 2004.

Japanese Office Action dated Feb. 15, 2005 from corresponding Japanese Application No. 2002-374342 (English translation enclosed).

Japanese Office Action dated Aug. 2, 2005 from corresponding Japanese Application No. 2002-374342 (English translation enclosed).

FlipChip International LLC, "Bumping DesignGuide," Jul. 2004 (40 pages).

* cited by examiner

Fig.8

BANDS USED BY WIRELESS LAN

| CHANNEL NO. | CENTER FREQUENCY | FREQUENCY BAND | | |
|---|---|---|---|---|
| 1 | 2412 | 2401 | ~ | 2423 |
| 2 | 2417 | 2406 | ~ | 2428 |
| 3 | 2422 | 2411 | ~ | 2433 |
| 4 | 2427 | 2416 | ~ | 2438 |
| 5 | 2432 | 2421 | ~ | 2443 |
| 6 | 2437 | 2426 | ~ | 2448 |
| 7 | 2442 | 2431 | ~ | 2453 |
| 8 | 2447 | 2436 | ~ | 2458 |
| 9 | 2452 | 2441 | ~ | 2463 |
| 10 | 2457 | 2446 | ~ | 2468 |
| 11 | 2462 | 2451 | ~ | 2473 |
| 12 | 2467 | 2456 | ~ | 2478 |
| 13 | 2472 | 2461 | ~ | 2483 |
| 14 | 2484 | 2473 | ~ | 2497 |

(MHz)

ANALYZING TECHNOLOGY OF RADIO WAVE IN WIRELESS INFORMATION COMMUNICATION

BACKGROUND OF THE INVENTION

1. Field of the Invention

The present invention relates to a technique for analyzing radio wave condition in wireless information communication, and more particularly to relates to a technique for analyzing radio wave propagation condition on channels for wireless data communications involving exchange of data by a spread spectrum communication technique on a plurality of channels with overlapping frequency bands.

2. Description of the Related Art

Communications constituting a wireless local area network (hereinafter termed wireless LAN) are one kind of wireless data communications involving exchange of data by a spread spectrum communication technique on a plurality of channels with overlapping frequency bands. Wireless LAN communications in accordance with the IEEE 802.11b standard employ 14 channels with center frequencies of 2412-2484 megahertz (hereinafter denoted as MHz), with signals being spread over a 22-24 MHz band for each channel. Conventionally, propagation condition of radio waves employed in such wireless LAN communications are discriminated on the basis of sensed electric field strength of received radio signals.

For example, JAPANESE PATENT LAID-OPEN GAZETTE No.2002-158667 discloses a technique for discriminating propagation condition of radio waves, using sensed electric field strength of received radio signals.

However, as the frequency band of one channel is overlapped by frequency bands of other channels, field strength of the center frequency band of the channel being discriminated, where sensed in a received radio signal, will result in field strength of radio signals spread in other channels being sensed as well, creating the problem of an inability to accurately discriminate radio wave propagation condition for an individual channel.

To address the problem described hereinabove, it is an object of the present invention to provide a technique for analyzing radio wave condition affording improved accuracy of discrimination of radio wave propagation condition on a per-channel basis.

SUMMARY OF THE INVENTION

To solve this problem, the invention provides analyzer device for analyzing the condition of radio waves employed in wireless data communication involving exchange of data by a spread spectrum communication technique on a selected channel among a plurality of channels with overlapping frequency bands, said analyzer device comprising: receiving unit that receives radio signals in said plurality of frequency bands; first strength sensing unit that senses field strength of the center frequency band on a per-channel basis from a said received radio signal; despreading unit that despreads said received radio signal; second strength sensing unit that senses field strength of the center frequency band on a per-channel basis from said despread radio signal; and discriminating unit that discriminates radio wave condition for each channel by cross-checking, on a per-channel basis, field strength sensed by said first strength sensing unit and field strength sensed by said second strength sensing unit.

The analyzer device discriminates and displays the propagation condition of a radio wave, using field strength sensed in a radio signal from which radio signals spread in other channels and signals other than wireless data communication radio signals have been eliminated by means of despreading the received radio signal. Thus, the propagation condition of the radio wave can be discriminated on the exclusive basis of field strength of the radio wave produced by wireless data communication on the channel being discriminated, thereby improving the accuracy of discrimination of radio wave propagation condition on a per-channel basis.

The analyzer device of the present invention having the arrangement described hereinabove may take any of the following modes. The discriminating means may discriminate among the following conditions: a condition of being currently in use by said wireless data communication, a condition of being suitable for use by said wireless data communication, and a condition of being unsuitable for use by said wireless data communication. With this analyzer device, the administrator of a base station for wireless data communication, on the basis of conditions discriminated by the analyzer device, can accurately select an appropriate installation location for a base station being administered, or an appropriate channel for use by an installed base station. Users of wireless data communication terminal devices, on the basis of conditions discriminated by the analyzer device, can accurately select an appropriate location for using their terminal device, or an appropriate channel for use by the terminal device.

The wireless data communications whose radio wave conditions are analyzed may include communications constituting a wireless local area network. It is accordingly possible to improve the accuracy of discrimination of radio wave propagation condition on a per-channel basis in a wireless local area network that uses a plurality of channels.

The invention, in an aspect thereof pertaining to a connection device, provides a connection device for connecting a terminal device to a wide area network via a wireless local area network in which data is exchanged by a spread spectrum communication technique on a selected channel among a plurality of channels with overlapping frequency bands, said connection device comprising: receiving unit that receives radio signals in said plurality of frequency bands; first strength sensing unit that senses field strength of the center frequency band on a per-channel basis from a said received radio signal; despreading unit that despreads said received radio signal; second strength sensing unit that senses field strength of the center frequency band on a per-channel basis from said despread radio signal; discriminating unit that discriminates radio wave condition for each channel by cross-checking, on a per-channel basis, field strength sensed by said first strength sensing unit and field strength sensed by said second strength sensing unit; and selecting unit that selects a channel for exchange of data with a terminal device, on the basis of discriminated radio wave condition.

The connection device discriminates the propagation condition of a radio wave and selects a channel for use in data exchange, using field strength sensed in a radio signal from which radio signals spread in other channels and signals other than wireless data communication radio signals have been eliminated by means of despreading the received radio signal. Thus, the propagation condition of the radio wave can be discriminated on the exclusive basis of field strength of the radio wave produced by wireless data communication on the channel being discriminated, thereby improving the accuracy of selection of a suitable channel for exchange of data.

The invention, in an aspect thereof pertaining to a terminal device, provides A terminal device connected to a connection device that provides a wireless local area network in which data is exchanged by a spread spectrum communication technique on a selected channel among a plurality of channels with overlapping frequency bands, in order to connect to a wide area network via said wireless local area network, said terminal device comprising: receiving unit that receives radio signals in said plurality of frequency bands; first strength sensing unit that senses field strength of the center frequency band on a per-channel basis from a said received radio signal; despreading unit that despreads said received radio signal; second strength sensing means for sensing field strength of the center frequency band on a per-channel basis from said despread radio signal; discriminating unit that discriminates radio wave condition for each channel by cross-checking, on a per-channel basis, field strength sensed by said first strength sensing unit and field strength sensed by said second strength sensing unit; and selecting unit that selects a channel for exchange of data with a connection device, on the basis of discriminated radio wave condition.

The terminal device discriminates the propagation condition of a radio wave and selects a channel for use in data exchange, using field strength sensed in a radio signal from which radio signals spread in other channels and signals other than wireless data communication radio signals have been eliminated by means of despreading the received radio signal. Thus, the propagation condition of the radio wave can be discriminated on the exclusive basis of field strength of the radio wave produced by wireless data communication on the channel being discriminated, thereby improving the accuracy of selection of a suitable channel for exchange of data.

The invention, in a aspect thereof pertaining to a method, provides a method for discriminating the condition of radio waves used in wireless data communication involving exchange of data by a spread spectrum communication technique on a selected channel among a plurality of channels with overlapping frequency bands, said method comprising the steps of receiving radio signals in said plurality of frequency bands; and discriminating radio wave condition for each channel by cross-checking, on a per-channel basis, field strength of the center frequency band of each channel sensed from said received radio signals, and field strength of the center frequency band of each channel sensed from radio signals obtained by despreading said received radio signals.

With this method, the propagation condition of a radio wave is discriminated using field strength sensed in a radio signal from which radio signals spread in other channels and signals other than wireless data communication radio signals have been eliminated by means of despreading the received radio signal. Thus, the propagation condition of the radio wave can be discriminated on the exclusive basis of field strength of the radio wave produced by wireless data communication on the channel being discriminated, thereby improving the accuracy of selection of a suitable channel for exchange of data.

BRIEF DESCRIPTION OF THE DRAWINGS

FIG. 8 is an illustration showing frequency bands of channels for wireless LAN communications.

DESCRIPTION OF THE PREFERRED EMBODIMENTS

A fuller understanding of the design and advantages of the present invention is provided through the following description of a technique for analyzing radio wave condition in wireless data communications employing the invention, taking by way of example a technique for analyzing radio wave condition in wireless LAN communications.

Figure 1:
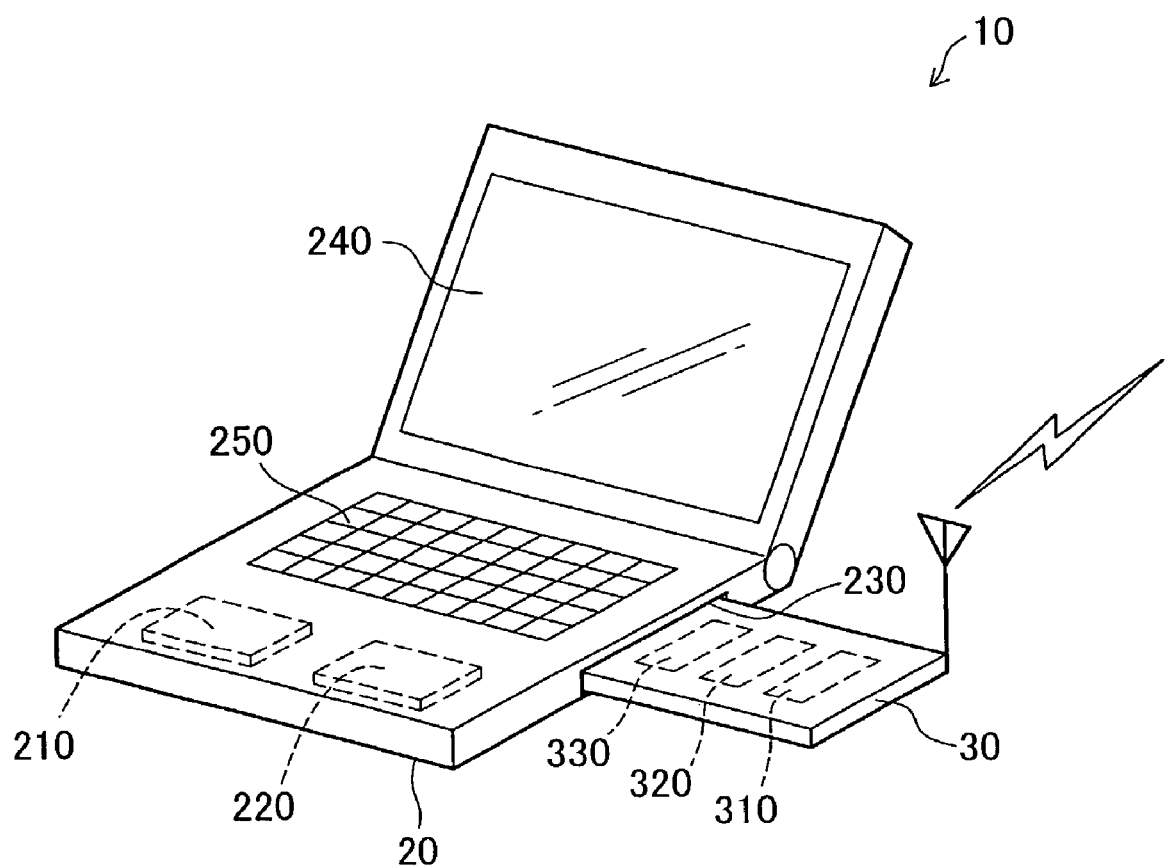
FIG. 1 illustrates exterior view of the analyzer device 10 in Embodiment 1.

The following description relates to an analyzer device 10 by way of a first embodiment of the invention. FIG. 1 is an exterior view of the analyzer device 10 in Embodiment 1. Analyzer device 10 analyzes the condition of radio waves used in wireless LAN communications in accordance with the IEEE 802.11b standard. As shown in FIG. 8, these wireless LAN communications employ 14 channels with center frequencies of 2412-2484 MHz, and having bandwidths of-24 MHz. Data is exchanged by a spread spectrum communication technique on a plurality of channels with overlapping frequency bands.

The analyzer device 10 comprises a notebook computer 20, and a wireless card 30 that can send and receive wireless LAN radio waves, i.e. a PCMCIA network PC card. Notebook computer 20 is an ordinary notebook type personal computer comprising a control unit 210 having a CPU, ROM, RAM and the like; a storage device 220 such as a hard disk drive (HDD), an interface device 320, specifically, a PCMCIA interface; a display device such as a display, for displaying text and graphics; and an input device 250, such as a keyboard, for receiving user input. Control unit 210 executes various processes in connection with analysis of radio wave condition in wireless LAN communications. Storage device 220 stores data resulting from processes executed by control unit 210. Interface device 230 connects to wireless card 30 for exchanging data. Display device 240 displays results of processes executed by control unit 210 on the display.

Wireless card 30 comprises an RF device 310 having an antenna, filter, RF/IF decoder, OFDM modem, and the like; a base band device 320 having a despreading circuit and the like; and a MAC device having a CUP, ROM, RAM and the like. RF device 310 performs processes relating to analog signals up to primary modulation, e.g., DBPSK (Differential Binary Phase Shift Keying), DQPSK (Differential Quadrature Phase Shift Keying), 4 bit CKK (Complementary Code Keying), 8 bit CCK or the like, for received radio waves in the frequency band used in wireless LAN communications. Base band device 320 despreads the primary modulated radio signal using the PN (Pseudorandom noise) code for the spread spectrum implemented in wireless LAN communications. MAC device 330 performs processes relating to digital signals in wireless LAN communications, as well as various processes relating to analysis of radio wave condition in wireless LAN communications.

Figure 2:
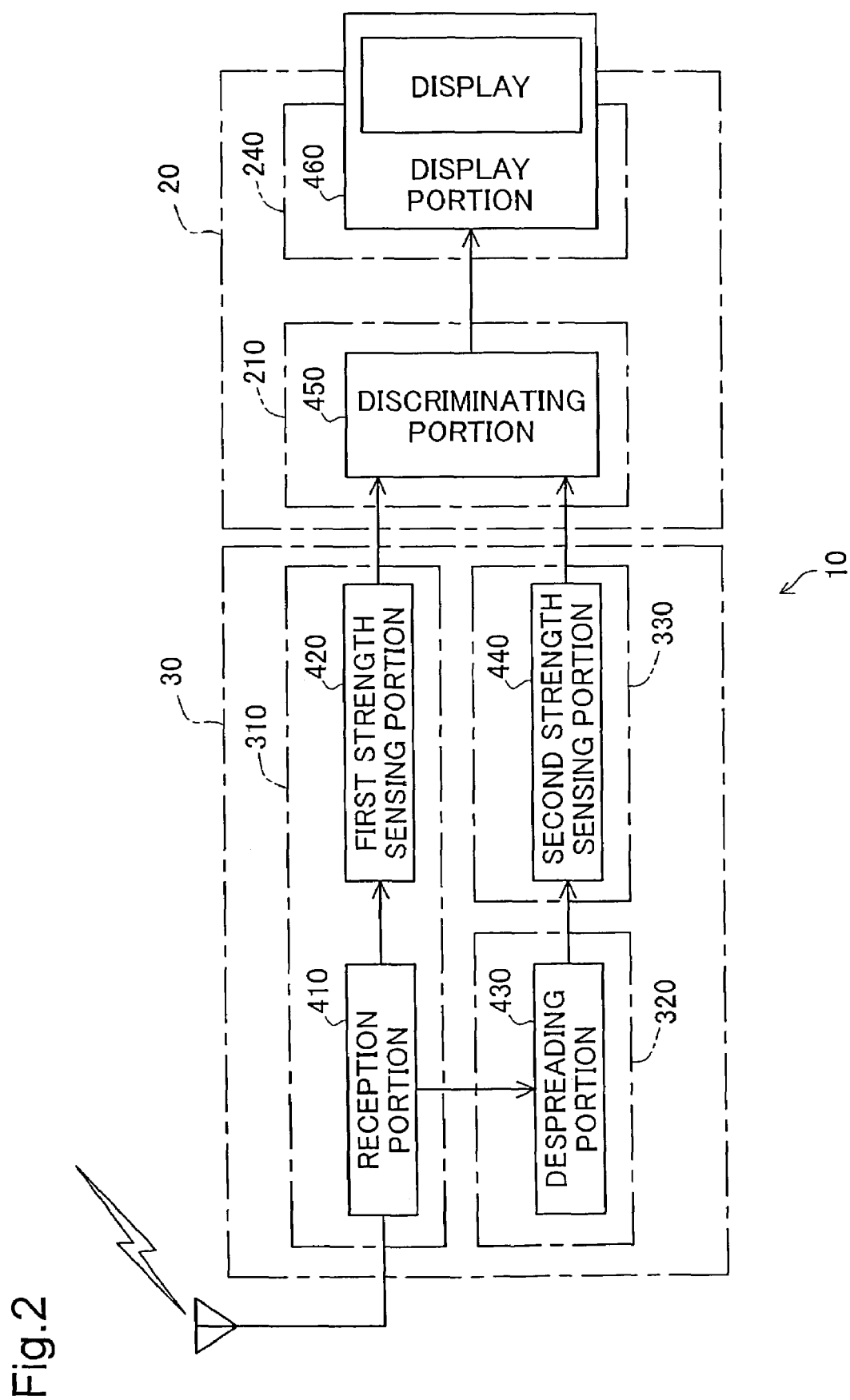
FIG. 2 is a block diagram showing a functional depicting of the internal architecture of the analyzer device 10 in Embodiment 1.

The internal architecture of analyzer device 10 will now be described in functional terms. FIG. 2 is a block diagram showing a functional depicting of the internal architecture of the analyzer device 10 in Embodiment 1. Analyzer device 10 comprises a reception portion 410 for receiving and processing radio signals in a plurality of frequency bands used in wireless LAN communications; a first strength sensing portion 420 for sensing the field strength (hereinafter RSSI1) of the center frequency band on a per-channel basis from a said received radio signal; a despreading portion 430 for despreading the received radio signal; a second strength sensing portion 440 for sensing the field strength (hereinafter RSSI2) of the center frequency band on a per-channel basis from the despread radio signal; a discriminating portion 450 for discriminating radio wave condition by cross-checking RSSI1 and RSSI2 on a per-channel basis; and a display portion 460 for displaying the discriminated radio wave condition.

RF device 310 performs the functions of reception portion 410 and first strength sensing portion 420; base band device 320 the function of despreading portion 430; and MAC device 330 the function of second strength sensing portion 440. In FIG. 2, the various devices making up analyzer device 10 are represented exclusively in terms of their function vis-a-vis the analyzer device, but in actual practice these devices also have various other functions for carrying out wireless LAN communications.

RSSI1 sensed by first strength sensing portion 420 represents field strength, prior to despreading, of a radio signal in the frequency band of a particular channel received by reception portion 410; accordingly, if wireless LAN communications are present on other channels, RSSI1 represents field strength that, in addition to the wireless LAN communication radio signal on the particular channel, will include radio signals spreading over from those other wireless LAN communications; and if devices other than wireless LAN communication devices, such as microwave ovens, ham radio devices, and the like, are present as well, will include radio signals from these devices as well. RSSI2 sensed by second strength sensing portion 440, on the other hand, represents field strength of the despread radio signal in the frequency band of a particular channel received by reception portion 410, and accordingly RSSI2 represents field strength of the wireless LAN communication radio signal on the particular channel only.

Figure 3:
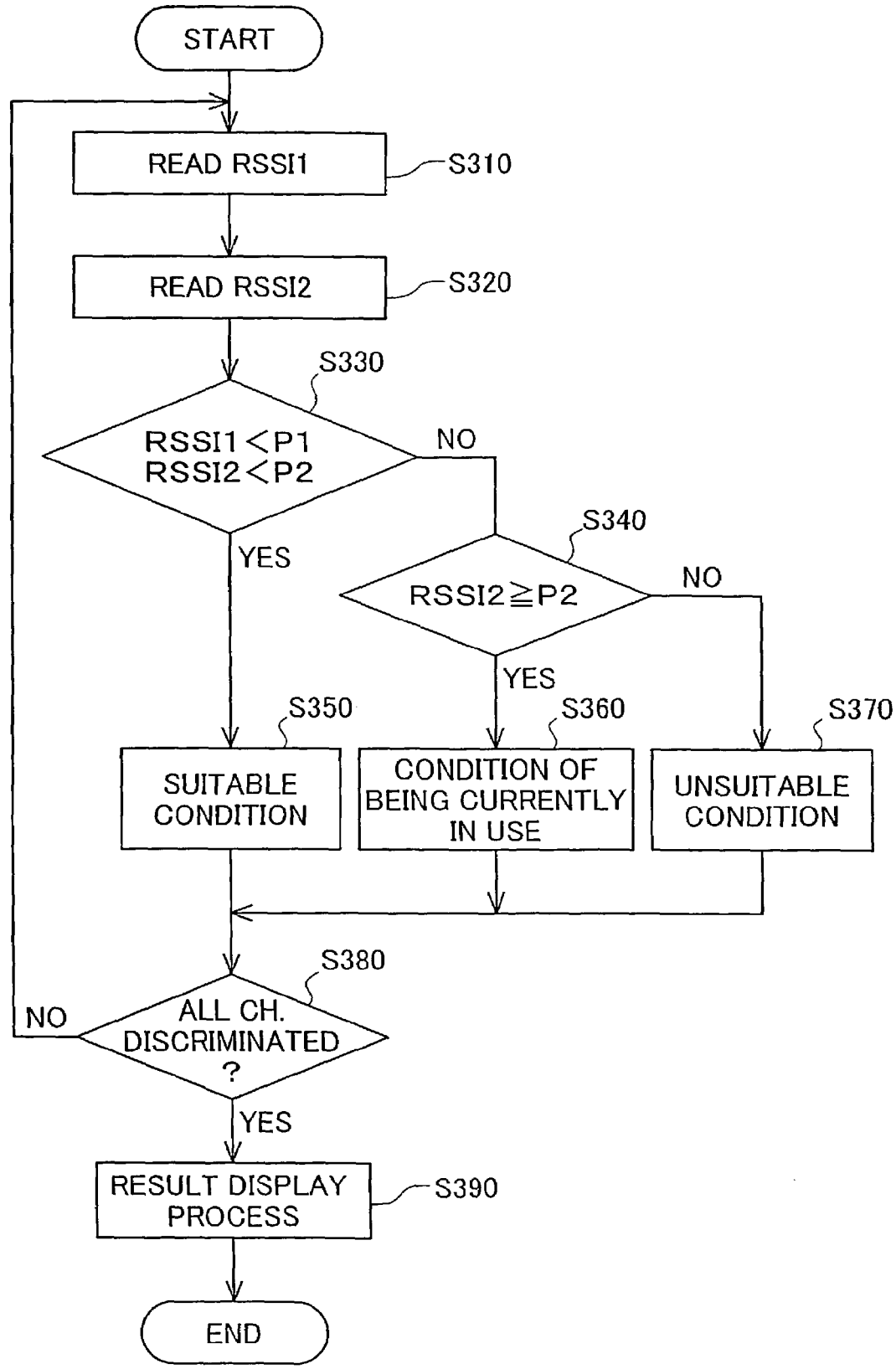
FIG. 3 is a flow chart showing the condition discrimination process of discriminating portion 450 in Embodiment 1.

The discriminating portion 450 of analyzer device 10 performs a process, described hereinbelow, to discriminate radio wave condition for each channel from RSSI1 and RSSI2 (hereinafter termed condition discrimination process). FIG. 3 is a flow chart showing the condition discrimination process of discriminating portion 450 in Embodiment 1. When input device 250 receives from the user of analyzer device 10 input initiating the analysis process, discriminating portion 450 starts the condition discrimination process shown in FIG. 3. This process is then repeated under predetermined timing until the input device 250 receives from the user of analyzer device 10 input canceling the analysis process. Once discriminating portion 450 initiates the process shown in FIG. 3, it first performs discrimination of radio wave condition on a first channel, by reading the RSSI1 for the first channel sensed by the first strength sensing portion 420 (Step S310), and reading the RSSI2 for the first channel sensed by the second strength sensing portion 440 (Step S310).

After reading RSSI2 (Step S320), RSSI1 and RSSI2 are cross-checked; if the absolute strength of RSSI1 is weaker than a preset P1 decibel meter and RSSI2 is weaker than a preset P2 decibel meter (Step S330), the discrimination is made that radio wave condition on the first channel is a "condition suitable for use by wireless LAN communication", i.e., not currently being used by wireless LAN communications and free of radio waves that would impair wireless LAN communications (Step S350). Values for P1 and P2 may be selected with reference to various factors, such as the relationship with the desired accuracy of discrimination.

In the event that the absolute strength of RSSI2 does not meet the requirements of Step S330, i.e. it exceeds P2 decibel meter (Step S340), the discrimination is made that radio wave condition on the first channel is a "condition of being currently in use by wireless LAN communications" (Step S360). If the requirements of Step S340 are not met either (Step S340), the discrimination is made that radio wave condition on the first channel is a "condition unsuitable for use by wireless LAN communication", due to the occurrence of radio waves that would impair wireless LAN communications (Step S370).

Once this discrimination process has been completed (Steps S350, S360, S370), a determination is made as to whether discrimination of radio wave condition has been done for all channels, i.e. channel 1 through channel 14 (Step S380). If discrimination has not been performed up through channel 14 (Step S380), discrimination is performed for the next channel (e.g., if discrimination has been done for channel 1, the next channel would be channel 2), by repeating the process beginning at Step S310. If, on the other hand, discrimination has performed for all channels (Step S380), a process to display on display portion 460 the discrimination results for radio wave condition on all channels (hereinafter termed result display process) is performed (Step S390). The process is then terminated.

Figure 4:
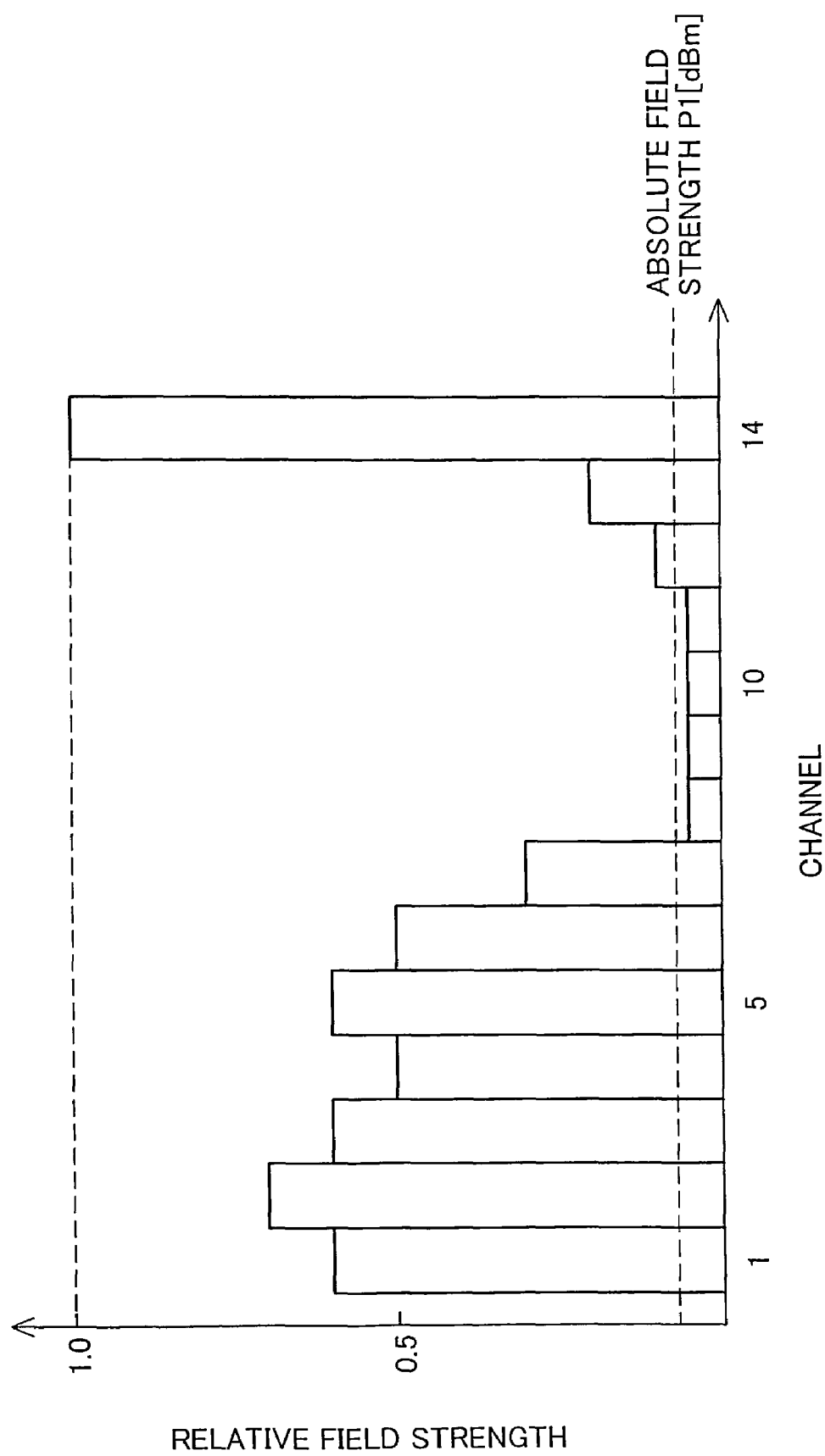
FIG. 4 is an illustration showing display of results of RSSI1 in Embodiment 1.

Display of results in the result display process shown in FIG. 3 (Step S390) is now described. Display of results for RSSI1 shall be described first. FIG. 4 is an illustration showing display of results of RSSI1 in Embodiment 1. Display of results for RSSI1 is shown on the horizontal axis, for channels 1 to 14 in order from left. On the vertical axis, RSSI1 for each channel is shown relatively in the form of a bar graph for all channels based on the channel having the highest strength; also shown is the absolute strength P1 decibel meter level based on the discrimination of radio wave condition in the condition discrimination process shown in FIG. 3, described earlier. In the display of results in FIG. 4, channels other than channels 8 to 11 are shown in a condition of being above P1 decibel meter.

Figure 5:
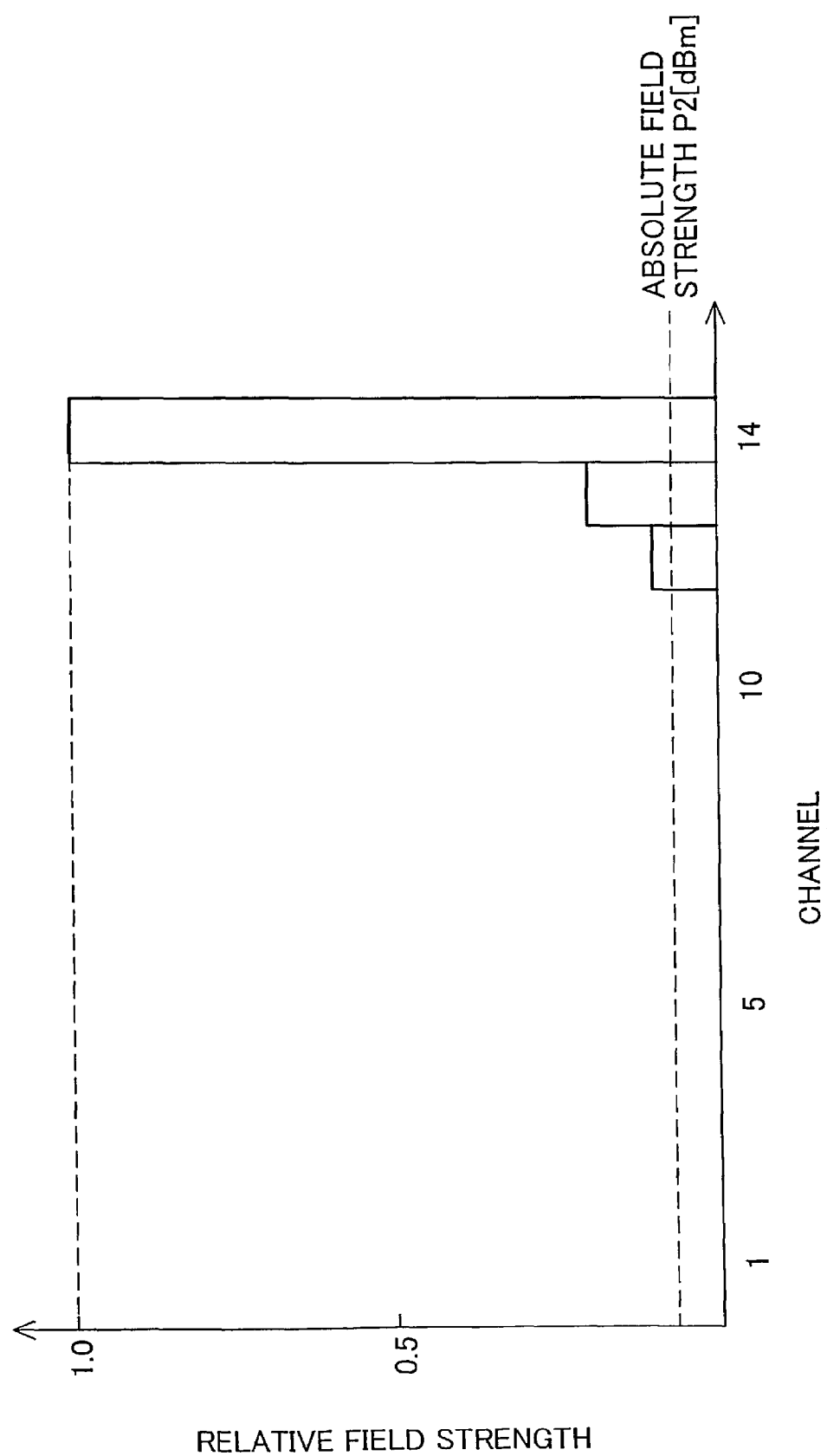
FIG. 5 is an illustration showing display of results of RSSI2 in Embodiment 1.

Display of results for RSSI2 shall be described next. FIG. 5 is an illustration showing display of results of RSSI2 in Embodiment 1. Display of results for RSSI2 is performed in a display format similar to the RSS1 display shown in FIG. 4, with absolute strength P2 decibel meter level based on the discrimination of radio wave condition in the condition discrimination process being shown. In the display of results in FIG. 5, channels 12 to 14 are shown in a condition of being above P2 decibel meter.

Figure 6:
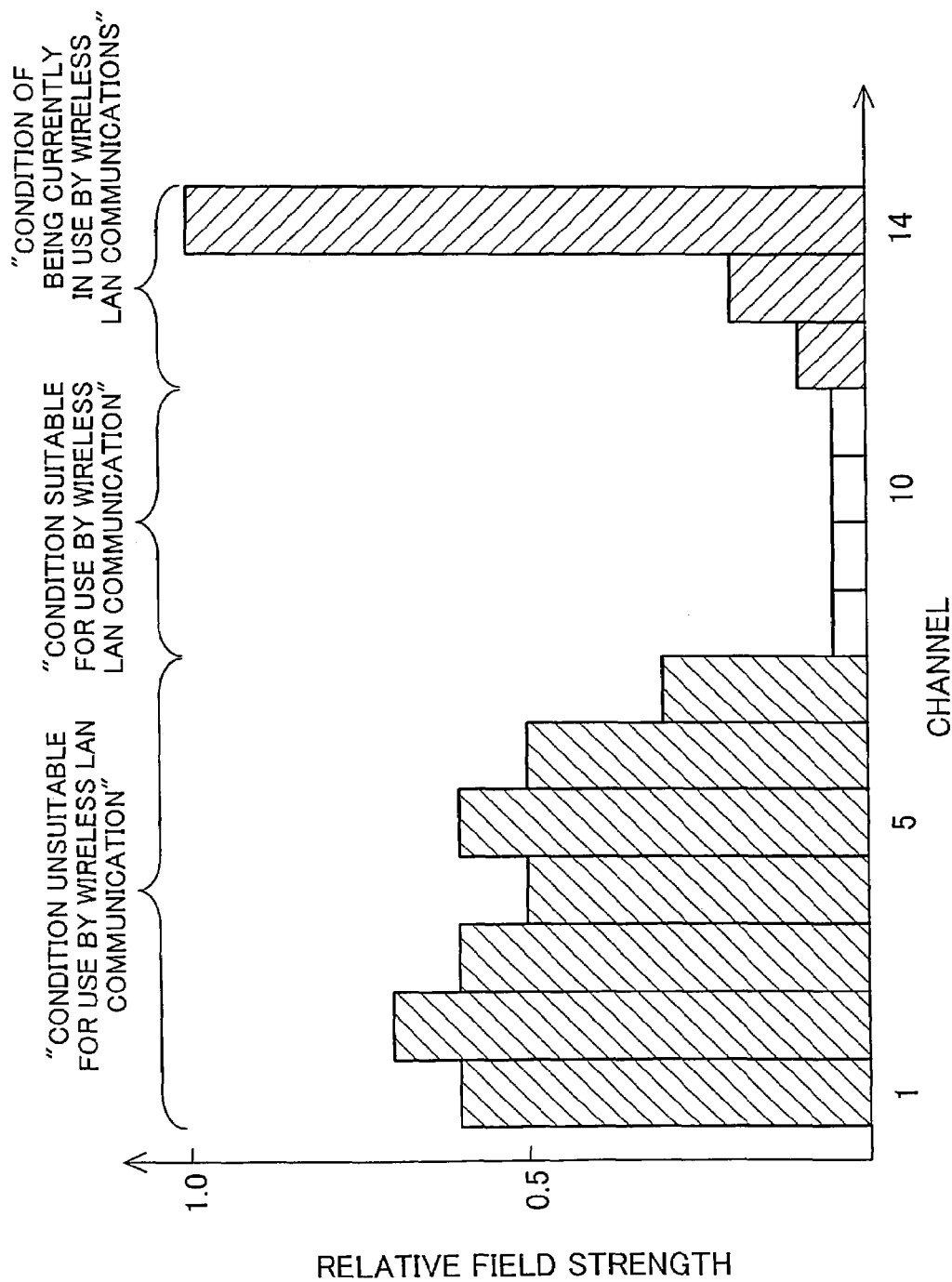
FIG. 6 is an illustration showing display of results of discrimination of radio wave condition in Embodiment 1.

Display of results of discrimination of radio wave condition shall be described next. FIG. 6 is an illustration showing display of results of discrimination of radio wave condition in Embodiment 1. Display of results for radio wave condition is performed in a display format similar to the RSSI1 display shown in FIG. 4, but in a point of difference from FIG. 4, the bar graph is shown with different colors depending on the discrimination result of the condition discrimination process shown in FIG. 3. In the display of results shown in FIG. 6, channels 8 to 11, having been discriminated to be in "condition suitable for use by wireless LAN communication", are displayed in "blue (shown unhatched in FIG. 6)". Channels 12 to 14, having been discriminated to be in "condition of being currently in use by wireless LAN communications", are displayed in "yellow (shown by right sloping hatching in FIG. 6). Channels 1 to 7, having been discriminated to be in "condition unsuitable for use by wireless LAN communication", are displayed in "red (shown by left sloping hatching in FIG. 6). Display of results in the result display process is not limited to the above, and may be performed in various different modes. For example, it would be possible to display only the results of discrimination of radio wave condition. Also, a graph display other than a bar graph display, or a character display or display with numbers, text or symbols would be possible as well. The display of results shown in FIG. 4-FIG. 6 could be displayed arrayed on a single screen, instead of on separate screens. This would enable the user of analyzer device 10 to readily ascertain radio wave condition.

In the embodiment described hereinabove, analyzer device 10 discriminates and displays radio wave propagation condition using RSSI2, from which radio signals spread in other channels and signals other than wireless LAN communication radio signals have been eliminated by means of despreading of the received radio signal by despreading portion 430. Accordingly, the propagation condition of a radio wave is discriminated using only the field strength of the wireless data communication radio wave on the channel to be discriminated, thus improving the accuracy of discrimination of radio wave propagation condition on a per-channel basis.

Figure 7:
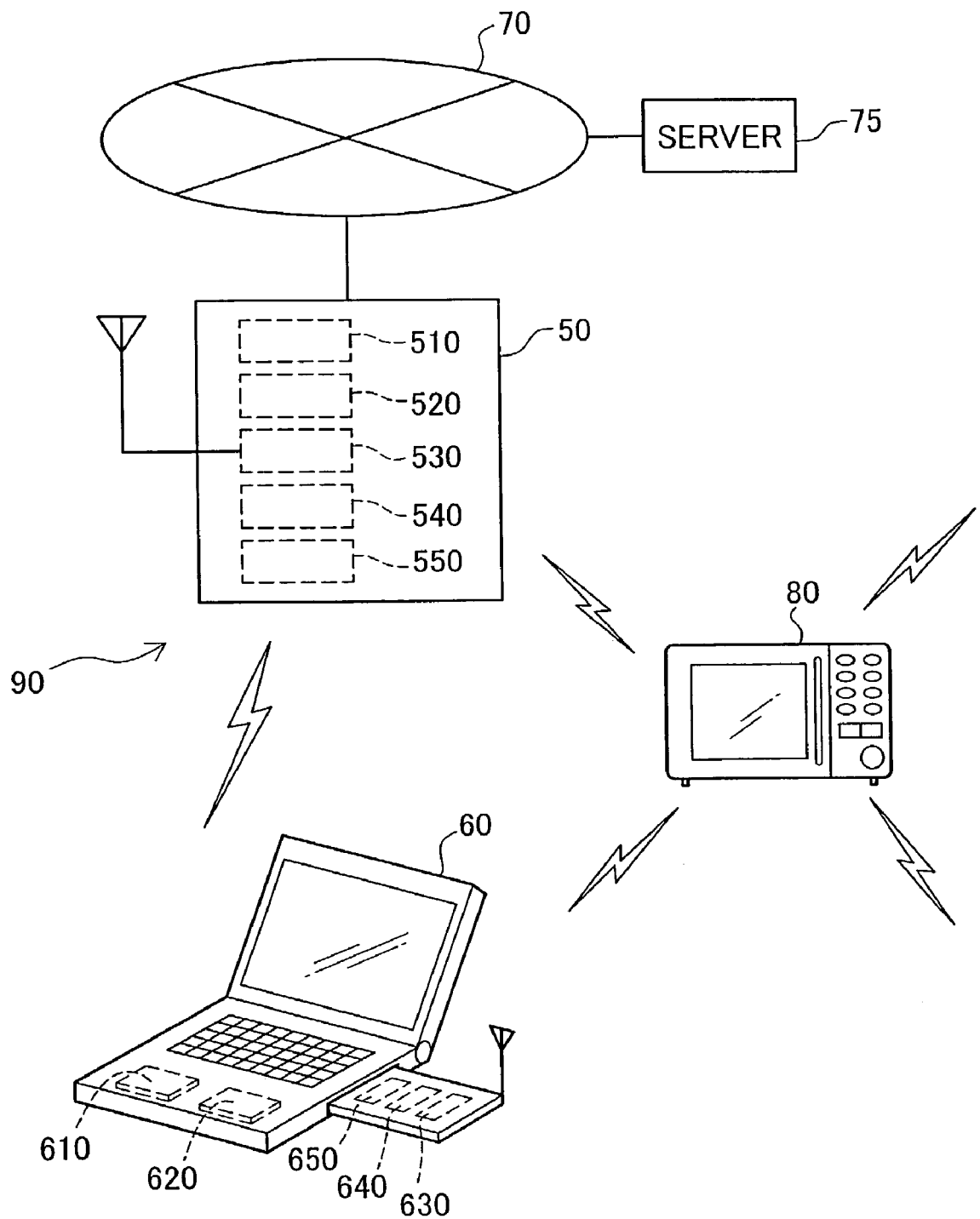
FIG. 7 illustrates a system diagram of access point system 90 in Embodiment 2.

An access point pertaining to a second embodiment of the invention is now described. FIG. 7 is a system diagram of access point system 90 in Embodiment 2. Access point system 90 employs a wide area network, here, the Internet. A connection device 50 is connected to the Internet 70. This connection device 50 connects to a terminal device 60 by means of wireless LAN according to the IEEE 802.11b standard. In FIG. 7, not all connection devices 50 and terminal devices 60 are shown, but in an actual access point system 90 there would be a number of connection devices 50 and terminal devices 60.

Connection device 50 relays data between terminal devices 60 that connected via a wireless LAN, and a sever 75 connected to the Internet. In this way, terminal devices 60 are provided with Internet access enabling exchange of data with a server 75 connected to the Internet 70. Internet access by terminal devices 60 may take the form of accessing web content, sending and receiving e-mail, or Internet telephony.

The internal architecture of connection device 50 is now described. Connection device 50 comprises a control unit 510 having a CPU, ROM, RAM and the like; a storage device 520 such as an HDD; an Internet 70 interface, and the like, as well as an RF device 510; a base band device 540; and a MAC device 550 analogous to those in analyzer device 10 shown in FIG. 1, described previously. Control device 510 executes various processes related to providing Internet access to terminal devices 60. Storage device 520 stores data resulting from processes executed by control unit 510.

The internal architecture of terminal device 60 is now described. The internal architecture of terminal device 60 is similar to that of analyzer device 10 shown in FIG. 1, comprising a control unit 610, storage device 620, RF device 630, base band device 640; MAC device 650 and so on. Control device 610 executes various processes related to providing Internet access by connection device 50.

The channel selection process by which connection device 50 selects a wireless LAN channel for connecting with a terminal device 60 is now described. In the event that communication speed on the currently used channel drops below a predetermined speed, the control device 510 of connection device 50 initiates a channel selection process. Situations in which a drop in communication speed might be experienced would include situations in which the same channel is being used by another connection device 50 located nearby, situations in which a large number of terminal devices 60 are connected via the same channel, and situations in which radio waves are emitted by a microwave oven 80 or similar device that uses radio waves of the same frequency band as the wireless LAN. When the process starts, after performing a process similar to the condition discrimination process shown in FIG. 3, with the exception of the result display process (Step S390), the channel having the lowest field strength is selected from among channels discriminated to be in "condition suitable for use by wireless LAN communication", and the process terminates. In the event that there is no channel discriminated to be in "condition suitable for use by wireless LAN communication", the channel having the lowest field strength is selected from among channels discriminated to be in "condition of being currently in use by wireless LAN communications", and the process terminates. After the process, the selected channel is used to transmit a beacon signal from terminal device 60 to request a connection. Connection is then made to the terminal device 60 requesting the connection.

The channel selection process by which a terminal device 60 selects a wireless LAN channel for connecting to connection device 50 is now described. In the event that communication speed on the currently used channel drops below a predetermined speed, the control device 610 of terminal device 60 initiates a channel selection process. When the process starts, after performing a process similar to the condition discrimination process shown in FIG. 3, with the exception of the result display process (Step S390), the channel having the lowest field strength is selected from among channels discriminated to be in "condition of being currently in use by wireless LAN communications", and the process terminates. After the process, the selected channel is used to transmit a beacon signal and request a connection from connection device 50, and connection is made to the connection device 50.

In the embodiment described hereinabove, connection device 50 and terminal device 60 discriminate radio wave propagation condition using field strength from which radio signals spread in other channels and signals other than wireless LAN communication radio signals have been eliminated by means of despreading of the received radio signal. Accordingly, the propagation condition of a radio wave is discriminated using only the field strength of the wireless data communication radio wave on the channel to be discriminated, thus improving the accuracy of discrimination of radio wave propagation condition on a per-channel basis.

While the invention has been shown and described hereinabove with reference to certain preferred embodiments, it is not limited thereto and may be put into practice in various other ways without departing from the scope and spirit thereof. For example, discriminated wireless data communications are not limited to wireless LAN communications, and could be other types of wireless LAN communications. Connection device 50 and terminal device 60 may be designed to perform a result display process (Step S390) to display results of discrimination, enabling the administrator or user to select an appropriate channel on the basis of the display.

What is claimed is:

1. An analyzer device for analyzing the condition of radio waves employed in wireless data communication in a wireless local area network (LAN) involving exchange of data by a spread spectrum communication technique on a selected channel among a plurality of channels with overlapping frequency bands, said analyzer device comprising:

receiving unit that receives radio signals in said plurality of overlapping frequency bands;

first strength sensing unit that senses field strength of the center frequency band of said plurality of frequency bands on a per-channel basis from a said received radio signal;

despreading unit that despreads said received radio signal to generate despread radio signals;

second strength sensing unit that senses field strength of the center frequency band on a per-channel basis from said despread radio signal; and discriminating unit that discriminates radio wave condition for each channel by effectively comparing, on a per-channel basis, field strength of the center frequency band of said received radio signals sensed by said first strength sensing unit to a first value and effectively comparing field strength of the center frequency band of the despread radio signals sensed by said second strength sensing unit to a second value in order to discriminate among the following conditions:

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value.

2. A connection device for connecting a terminal device to a wide area network via a wireless local area network (LAN) in which data is exchanged by a spread spectrum communication technique on a selected channel among a plurality of channels with overlapping frequency bands, said connection device comprising:

receiving unit that receives radio signals in said plurality of frequency bands;

first strength sensing unit that senses field strength of the center frequency band on a per-channel basis from a said received radio signal;

despreading unit that despreads said received radio signal;

second strength sensing unit that senses field strength of the center frequency band on a per-channel basis from said despread radio signal;

discriminating unit that discriminates radio wave condition for each channel by cross-checking, on a per-channel basis, field strength of the center frequency band sensed by said first strength sensing unit and field strength of the center frequency band sensed by said second strength sensing unit and wherein the discriminating unit discriminates among the following conditions:

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value; and selecting unit that selects a channel for exchange of data with a terminal device, on the basis of discriminated radio wave condition.

3. A terminal device connected to a connection device that provides a wireless local area network (LAN) in which data is exchanged by a spread spectrum communication technique on a selected channel among a plurality of channels with overlapping frequency bands, in order to connect to a wide area network via said wireless local area network, said terminal device comprising:

receiving unit that receives radio signals in said plurality of frequency bands;

first strength sensing unit that senses field strength of the center frequency band on a per-channel basis from a said received radio signal;

despreading unit that despreads said received radio signal;

second strength sensing means for sensing field strength of the center frequency band on a per-channel basis from said despread radio signal;

discriminating unit that discriminates radio wave condition for each channel by cross-checking, on a per-channel basis, field strength of the center frequency band sensed by said first strength sensing unit and field strength of the center frequency band sensed by said second strength sensing unit and wherein the discriminating unit discriminates among the following conditions;

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values;

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value; and selecting unit that selects a channel for exchange of data with a connection device, on the basis of discriminated radio wave condition.

4. A method for discriminating the condition of radio waves used in wireless data communication in a wireless local area network (LAN) involving exchange of data by a spread spectrum communication technique on a selected channel among a plurality of channels with overlapping frequency bands, said method comprising the following steps of:

receiving radio signals in said plurality of frequency bands; and discriminating radio wave condition for each channel by cross-checking, on a per-channel basis, field strength of the center frequency band of each channel sensed from said received radio signals and field strength of the center frequency band of each channel sensed from radio signals obtained by despreading said received radio signals, and wherein the discriminating unit discriminates among the following conditions;

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value.

5. An analyzer device for analyzing the condition of radio waves employed in wireless data communication involving exchange of data by a spread spectrum communication technique on a selected channel among a plurality of channels with overlapping frequency bands, said analyzer device comprising:

a receiving unit disposed in a first radio wave environment that receives radio signals in said plurality of frequency bands;

a first strength sensing unit that senses a first field strength of the center frequency band, on a per-channel basis, from the received radio signal wherein the first field strength operates in the first radio wave environment;

a despreading unit that despreads the received radio signal;

a second strength sensing unit that senses a second field strength of the center frequency band, on a per-channel basis, from said despread radio signal wherein the second field strength also operates in the first radio wave environment; and a discriminating unit that discriminates radio wave condition for each channel by cross-checking, on a per-channel basis, the first field strength of the center frequency band and the second field strength of the center frequency band in order to discriminate among the following conditions:

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value.

6. An analyzer device in accordance with claim 5 wherein said wireless data communications include communications constituting a wireless local area network.

7. A connection device for connecting a terminal device to a wide area network via a wireless local area network (LAN) in which data is exchanged by a spread spectrum communication technique on a selected channel among a plurality of channels with overlapping frequency bands, said connection device comprising:

a receiving unit operating in a first radio wave environment, the receiving unit receives radio signals in said plurality of frequency bands;

a first strength sensing unit that senses a first field strength of the center frequency band, on a per-channel basis, from the received radio signals wherein the first field strength operates in the first radio wave environment;

a despreading unit that despreads said received radio;

a second strength sensing unit that senses a second field strength of the center frequency band, on a per-channel basis, from said despread radio signal wherein the second field strength operates in the first radio wave environment;

a discriminating unit that discriminates radio wave condition for each channel by cross-checking, on a per-channel basis, the first field strength of the center frequency band and the second field strength of the center frequency band in order to discriminate among the following conditions:

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value; and a selecting unit that selects a channel for exchange of data with a terminal device, on the basis of discriminated radio wave condition.

8. A terminal device connected to a connection device that provides a wireless local area network (LAN) in which data is exchanged by a spread spectrum communication technique on a selected channel among a plurality of channels with overlapping frequency bands, in order to connect to a wide area network via said wireless local area network, said terminal device comprising:

a receiving unit operating in a first radio wave environment, the receiving unit receiving radio signals in said plurality of overlapping frequency bands;

a first strength sensing unit that senses a first field strength of the center frequency band, on a per-channel basis, from a said received radio signal wherein the first field strength operates in the first radio wave environment; a despreading unit that despreads said received radio signal;

a second strength sensing means for sensing a second field strength of the center frequency band, on a per-channel basis, from said despread radio signal wherein the second field strength operates in the first radio wave environment;

a discriminating unit that discriminates radio wave condition for each channel by cross-checking, on a per-channel basis, the first field strength of the center frequency band and the second field strength of the center frequency band in order to discriminate among the following conditions:

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value; and a selecting unit that selects a channel for exchange of data with a connection device, on the basis of discriminated radio wave condition.

9. A method for discriminating the condition of radio waves used in wireless data communication involving exchange of data by a spread spectrum communication technique on a selected channel among a plurality of channels with overlapping frequency bands, said method comprising the following steps of:

receiving radio signals in a first radio wave environment, wherein the radio signals comprise a plurality of frequency bands; and a discriminating radio wave condition for each channel by cross-checking, on a per-channel basis, a first field strength of the center frequency band of each channel sensed from said received radio signals wherein the first field strength operating in the first radio wave environment, and cross-checking, on a per-channel basis, a second field strength of the center frequency band of each channel sensed from radio signals operating in the first radio wave environment obtained by despreading said received radio signals in order to discriminate among the following conditions:

a condition of being suitable for use by said wireless data communication in the wireless LAN when (i) the field strength of the center frequency band of said received radio signals is less than the first value and (ii) the field strength of the center frequency band of the despread radio signals is less than the second value, and when the field strengths of the center frequencies of said received and despread signals are not both respectively less than the first and second values:

a condition of being currently in use by said wireless data communication in the wireless LAN when (i) the field strength of the center frequency band of the despread radio signals is greater or equal to the second value; and a condition of being unsuitable for use by said wireless data communication in the wireless LAN when the field strength of the center frequency band of the despread radio signals is less than the second value.

* * * * *

UNITED STATES PATENT AND TRADEMARK OFFICE
CERTIFICATE OF CORRECTION

PATENT NO. : 7,653,404 B2 Page 1 of 1
APPLICATION NO. : 10/384403
DATED : January 26, 2010
INVENTOR(S) : Maki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 584 days.

Signed and Sealed this

Twenty-third Day of November, 2010

David J. Kappos
*Director of the United States Patent and Trademark Office*